(12) United States Patent
Watanabe et al.

(10) Patent No.: US 9,374,528 B2
(45) Date of Patent: Jun. 21, 2016

(54) PANORAMIC EXPANSION IMAGE DISPLAY DEVICE AND METHOD OF DISPLAYING PANORAMIC EXPANSION IMAGE

(75) Inventors: Takeshi Watanabe, Kanagawa (JP); Sumio Yokomitsu, Tokyo (JP); Hirofumi Fujii, Kanagawa (JP); Takeshi Fujimatsu, Kanagawa (JP); Yuichi Matsumoto, Kanagawa (JP); Michio Miwa, Chiba (JP); Masataka Sugiura, Tokyo (JP); Mikio Morioka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 251 days.

(21) Appl. No.: 13/697,635

(22) PCT Filed: May 16, 2011

(86) PCT No.: PCT/JP2011/002712
§ 371 (c)(1),
(2), (4) Date: Nov. 13, 2012

(87) PCT Pub. No.: WO2011/145322
PCT Pub. Date: Nov. 24, 2011

(65) Prior Publication Data
US 2013/0057546 A1 Mar. 7, 2013

(30) Foreign Application Priority Data

May 17, 2010 (JP) .................................. 2010-112855

(51) Int. Cl.
*G06T 15/00* (2011.01)
*H04N 5/232* (2006.01)
(Continued)

(52) U.S. Cl.
CPC .......... *H04N 5/23238* (2013.01); *G06T 3/4038* (2013.01); *G03B 15/10* (2013.01)

(58) Field of Classification Search
None
See application file for complete search history.

(56) References Cited

U.S. PATENT DOCUMENTS

2002/0163530 A1* 11/2002 Takakura et al. ............. 345/629
2005/0099500 A1   5/2005 Fujita
(Continued)

FOREIGN PATENT DOCUMENTS

CN        101577795       11/2009
EP         1571854 A1      9/2005
(Continued)

OTHER PUBLICATIONS

Office Action issued in China Counterpart Patent Appl. No. 201180024503.7, dated Sep. 7, 2015, along with an English translation thereof.
(Continued)

*Primary Examiner* — James A Thompson
*Assistant Examiner* — Xilin Guo
(74) *Attorney, Agent, or Firm* — Greenblum & Bernstein, P.L.C.

(57) ABSTRACT

A panoramic image display device divides a panoramic expansion image into at least two panoramic images and displays the panoramic images. The panoramic expansion image display device including: a clipping reference position setting unit that sets a clipping reference position for the panoramic expansion image; an object detection unit that detects an object as a display target from the panoramic expansion image; a clipping position determination unit that determines a clipping position of the panoramic image according to a relationship between a detected object position and the clipping reference position; and a display image generation unit that displays the panoramic image clipped from the panoramic expansion image at the clipping position.

20 Claims, 12 Drawing Sheets

(51) Int. Cl.
*G06T 3/40* (2006.01)
*G03B 15/10* (2006.01)

(56) References Cited

U.S. PATENT DOCUMENTS

| | | |
|---|---|---|
| 2005/0151837 A1 | 7/2005 | Cutler |
| 2005/0206581 A1* | 9/2005 | Kondo et al. .................. 345/1.2 |
| 2005/0206659 A1 | 9/2005 | Cutler |
| 2006/0132597 A1 | 6/2006 | Mashitani et al. |
| 2007/0120845 A1* | 5/2007 | Matsumoto .................... 345/419 |
| 2008/0002916 A1* | 1/2008 | Vincent et al. ................ 382/305 |
| 2010/0141772 A1* | 6/2010 | Inaguma et al. ............. 348/169 |
| 2010/0158401 A1* | 6/2010 | Shiraishi et al. ............. 382/243 |
| 2010/0302347 A1* | 12/2010 | Shikata ........................... 348/36 |
| 2011/0182512 A1* | 7/2011 | Nishi ............................. 382/173 |
| 2011/0234852 A1* | 9/2011 | Ishida ....................... 348/231.99 |
| 2012/0281913 A1* | 11/2012 | Kutaragi et al. ............. 382/165 |

FOREIGN PATENT DOCUMENTS

| | | |
|---|---|---|
| JP | 06-189180 | 7/1994 |
| JP | 2000-078611 | 3/2000 |
| JP | 2002-152722 | 5/2002 |
| JP | 2004-282535 | 10/2004 |
| JP | 2005-128815 | 5/2005 |
| JP | 2006-191535 | 7/2006 |
| JP | 2006-211105 | 8/2006 |
| JP | 2007-196577 | 8/2007 |
| JP | 2008-028606 | 2/2008 |
| JP | 2010-068071 | 3/2010 |
| JP | 2010-074706 | 4/2010 |

OTHER PUBLICATIONS

Extended European Search Report, mailed Oct. 14, 2015 by the European Patent Office (EPO), for the corresponding European Patent Application No. 11783259.2.

* cited by examiner

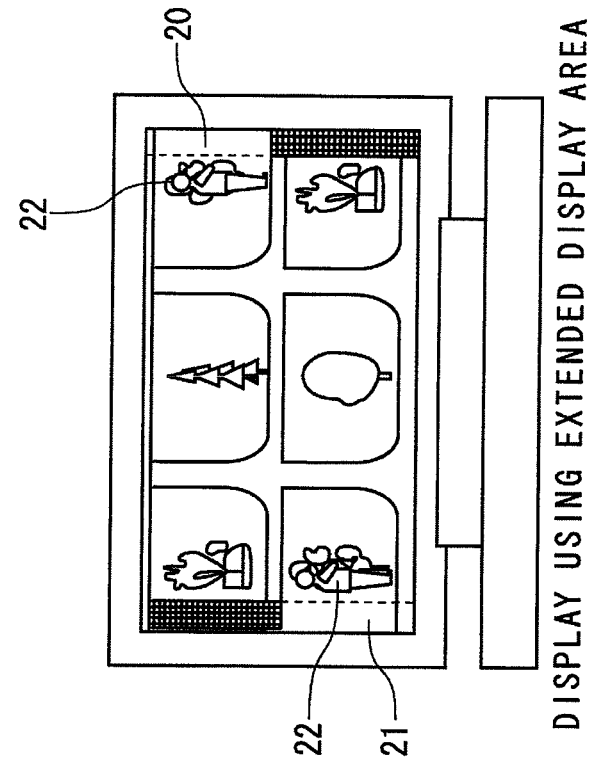
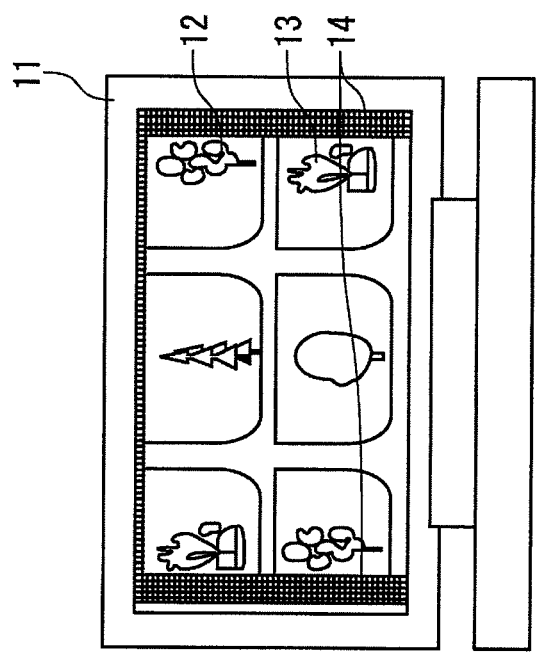
FIG. 4(a) DISPLAY AT REFERENCE POSITION
FIG. 4(b) DISPLAY USING EXTENDED DISPLAY AREA

PANORAMIC EXPANSION IMAGE DISPLAY DEVICE AND METHOD OF DISPLAYING PANORAMIC EXPANSION IMAGE

TECHNICAL FIELD

The present invention relates to a panoramic development image display device and a method of panoramic development image.

BACKGROUND ART

Generally, an image obtained by panoramically expanding an entire circumferential image has such features that one length of the image is much longer than the other length thereof. For that reason, as means for displaying the overall image panoramically expanded at a time, there is a technique in which the image is cut into a plurality of pieces, and the respective pieces are aligned vertically and displayed with a multistage configuration (for example, refer to Patent Document 1).

In Patent Document 1, in an annular frame of 360° which is imaged by a fisheye lens, an inner circle and an outer circle are set to determine a height of the image to be panoramically expanded. For example, when an omnidirectional imaging device is placed on the center of a table to image a conference scene, processing is enabled without cutting off a head of an object.

RELATED ART DOCUMENTS

Patent Documents

Patent Document 1: JP-A-2008-28606

SUMMARY OF THE INVENTION

Problem to be Solved by the Invention

However, the panoramic expansion image pickup device of Patent Document 1 is not intended for a scene in which an object of interest frequently travels, and suffers from such a problem that the object is cut off when the object travels to a boundary of a clipped image in clipping the panoramic expansion image into a plurality of stages.

The present invention has been made to solve the problem with the conventional art, and aims at providing a panoramic expansion image display device and a method of displaying panoramic expansion image which can image an object without any interruption by varying a display form according to a travel of the object on the panoramic expansion image.

Means for Solving the Problem

According to the present invention, there is provided a panoramic expansion image display device which divides a panoramic expansion image into at least two panoramic images and displays the panoramic images, the panoramic expansion image display device including: a clipping reference position setting unit that sets a clipping reference position for the panoramic expansion image; an object detection unit that detects an object as a display target from the panoramic expansion image; a clipping position determination unit that determines a clipping position of the panoramic image according to a relationship between a detected object position and the clipping reference position; and a display image generation unit that displays the panoramic image clipped from the panoramic expansion image at the clipping position.

With the above configuration, when the panoramic expansion image is clipped into a plurality of stages, aligned vertically, and displayed, a screen configuration to be displayed can be changed on the basis of position information of the object, and display is enabled so that the connection between the panoramic images is understandable by the user.

Further, according to the present invention, in the panoramic expansion image display device, the panoramic expansion image is an expanded moving image, and the clipping position determination unit determines the clipping position such that a total body of the object is contained in the panoramic image when a position of the object approaches the clipping reference position.

With the above configuration, a screen end can be displayed with expansion or contraction when the object travels to the panoramic screen end, and a fact that the object travels to the image end is easily visually understood by the user, and the object can be prevented from being reflected with interruption.

Further, according to the present invention, the panoramic expansion image display device further includes a display unit that displays the panoramic image in a display area, and after the clipping position is updated, the display image generation unit changes a size of the panoramic image according to the display area and displays the size-changed panoramic image.

With the above configuration, when the object travels to the panoramic image end, a display range of the panoramic image is displayed with expansion or contraction, and the image can be resized according to the display area. The fact that the object travels to the image end is easily visually understood by the user, to enable display without wasting the display area.

Further, according to the present invention, the panoramic expansion image display device further includes a background feature extraction unit that extracts a background image feature of a background from the panoramic expansion image, and the clipping reference position determination unit determines the clipping reference position based on the background image feature.

With the above configuration, the panoramic image can be displayed on the basis of the background feature, to thereby enable display understandable by the user.

Further, according to the present invention, in the panoramic expansion image display device, the background feature extraction unit uses color information.

With the above configuration, a portion in which a distinct object or a signboard is present on the image end of the clipped image can be selected to assist the user's understanding of a space.

Further, according to the present invention, in the panoramic expansion image display device, the background feature extraction unit uses character information.

With the above configuration, a portion in which a distinct object or a signboard is present on the image end of the clipped image can be selected to assist the user's understanding of a space.

Further, according to the present invention, in the panoramic expansion image display device, the background feature extraction unit uses texture information.

With the above configuration, a setup that does not select a portion in which textures are constant as the clipped image end is enabled, and a background portion having a feature on the image end can be automatically selected to assist the user's understanding of the space.

Further, according to the present invention, in the panoramic expansion image display device, the background feature extraction unit uses detection frequency information on the object.

With the above configuration, a region such as a busy way to which the user gives attention is not selected as a cut line of the panoramic image of the image.

Further, according to the present invention, in the panoramic expansion image display device, the clipping reference position determination unit makes the determination such that the ends of the panoramic images overlap with each other.

With the above configuration, the alignment or nonalignment between the image ends can be known, and the user's understanding of the space can be assisted.

Further, according to the present invention, there is provided a panoramic expansion image display device which divides a panoramic expansion image into at least two panoramic images, and displays the panoramic images, the panoramic expansion image display device including: a clipping reference position setting unit that sets a clipping reference position for the panoramic expansion image; an object detection unit that detects an object as a display target from the panoramic expansion image; a clipping position determination unit that determines a clipping position of the panoramic image according to a relationship between a detected object position and the clipping reference position; a 3D position determination unit that clips the panoramic image from the panoramic expansion image at the clipping position, and determines the degree of 3D protrusion according to a position of the object in the panoramic image; and a 3D image generation unit that creates a 3D image in which the object protrudes, according to the degree of 3D protrusion determined by the 3D position determination unit.

With the above configuration, when the panoramic expansion image is clipped into a plurality of stages, aligned vertically, and displayed, the screen configuration to be displayed can be changed on the basis of position information of the object. Also, the position of the object can be three-dimensionally displayed, and the display enables the user to easily grasp the link of the panoramic images to each other, and a positional relationship of the object by the aid of a stereoscopic position of the object.

Further, according to the present invention, there is provided a panoramic expansion image display device which divides a panoramic expansion image into at least two panoramic images and displays the panoramic images, the panoramic expansion image display device including: a clipping reference position setting unit that sets a clipping reference position for the panoramic expansion image; an object detection unit that detects an object as a display target from the panoramic expansion image; a 3D position determination unit that determines the degree of 3D protrusion according to a position of the object in the panoramic image; and a 3D image generation unit that creates a 3D image in which the object protrudes, according to the degree of 3D protrusion determined by the 3D position determination unit.

With the above configuration, the display in which the link of the panoramic images to each other is easily understood by the user can be realized.

Further, according to the present invention, in the panoramic expansion image display device, the 3D position determination unit makes the same degree of protrusion at ends of the different panoramic images which have been connected before division.

With the above configuration, the alignment or nonalignment between the image ends can be known, and the user's understanding of the space can be assisted.

Advantages of the Invention

According to the present invention, there can be provided the panoramic expansion image display device and a method of displaying panoramic expansion image, which have advantageous effects that the user's understanding of the space is assisted to allow the link of the panoramic images to each other to be easily understood when the panoramic expansion image is clipped into a plurality of stages and displayed, and the object is displayed without any interruption even in the scene in which the object frequently travels.

BRIEF DESCRIPTION OF THE DRAWINGS

FIGS. 4(a) and 4(b) are diagrams illustrating a two-screen configuration of the panoramic expansion image display device using the extended display area.

MODE FOR CARRYING OUT THE INVENTION

First Embodiment

Hereinafter, a description will be given of a panoramic expansion image display device according to an embodiment of the present invention with reference to the drawings. In this example, an omnidirectional camera that enables 360-degree imaging is used for obtaining a panoramic expansion image.

Figure 1:
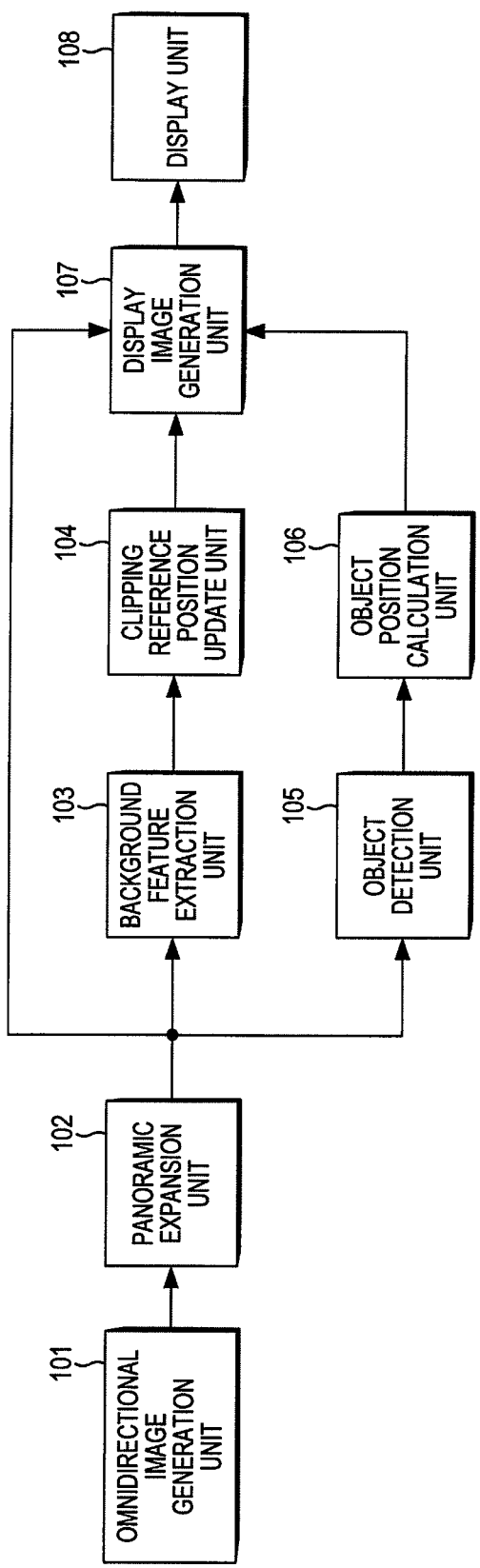
FIG. 1 is a block diagram of a panoramic expansion image display device according to a first embodiment of the present invention.

A configuration of the panoramic expansion image display device according to a first embodiment of the present invention will be illustrated in FIG. 1. Referring to FIG. 1, a panoramic expansion image display device 100 includes an omnidirectional image generation unit 101 that generates an omnidirectional image from an omnidirectional camera such as a fisheye camera, a panoramic expansion unit 102 that panoramically expands the omnidirectional image, and a background feature extraction unit 103 that extracts an image feature amount of a background from a panoramic expansion image. The panoramic expansion image display device 100 also includes a clipping reference position update unit 104 that updates a clipping reference position suitable to clip the panoramic expansion image on the basis of a background feature, an object detection unit 105 that detects an object which is a display target, and an object position calculation unit 106 that calculates a position of the detected object. The panoramic expansion image display device 100 further includes a display image generation unit 107 that determines a position of an image end when clipping the panoramic expansion image on the basis of the clipping reference position extracted previously and object positional information to generate a plurality of clipped panoramic images, and a display unit 108 that displays the plurality of clipped panoramic images generated by the display image generation unit 107.

An operation flow of the panoramic expansion image display device 100 configured as described above is illustrated in FIG. 2. First, the omnidirectional camera image is acquired from the omnidirectional image generation unit 101 (Step 201). Then, the acquired omnidirectional camera image is expanded by the panoramic expansion unit 102, to obtain a panoramic expansion image into which the omnidirectional image of 360 degrees is cut at an arbitrary position and expanded (Step 202). As the panoramic expansion technique, a general technique disclosed in Patent Document 1 can be used. Also, because the omnidirectional image of 360 degrees is expanded, a left end and a right end of the expansion image are actually areas adjacent to each other. Even if the expansion image is cut out at a given distance from the left (right) end of the panoramic expansion image, and connected to the right (left) end as it is, a connectivity of the image is held depending on a clipping reference position described later.

Subsequently, it is determined whether the clipping reference position is updated, or not (Step 203). In this step, it is determined that the clipping reference position is updated at the time of initially starting the panoramic expansion image display device 100, at the time of largely changing an area to be imaged due to another factor, or at an arbitrary timing determined by the operator. If it is determined that update is conducted, the clipping reference position is updated (Steps 204 and 205).

In the update of the clipping reference position, the background feature extraction unit 103 first extracts a background feature amount such as texture information, color information, or character information on the image (Step 204). In this situation, the feature amount to be extracted may be acquired by another route using a sensor or the like aside from image processing.

Subsequently, with the use of the background feature amount obtained in Step 204, the clipping reference position update unit 104 updates the clipping reference position, and updates the background information (Step 205). The clipping reference position update unit 104 obtains the reference position when clipping the panoramic expansion image into the panoramic image. In order to facilitate understanding of a correspondence relationship between the respective ends of the panoramic images divided into the plurality of stages, a value of a background information score is increased more in an area having a graphic feature (texture is not uniform, color is particular as compared with other colors, character information such as a signboard is embedded, etc.). On the other hand, if the object travels, since it is preferable that no object is present on the end of the panoramic image, the background information score is calculated so that its value becomes lower as the detection frequency of the object is higher.

In this way, the background information representative of where the characteristic region (body) is located on the panoramically expanded image is obtained, and the clipping reference position of the panoramic expansion image is set and updated so that the areas high in the background score are preferentially selected for the respective image ends of the clipped panoramic images. For example, when the panoramic expansion image is divided into N stages and displayed, an area of the highest background score is set to be included on the left end of a first-stage divided image, and the entire panoramic expansion image is divided into N pieces with reference to a position of that area, and displayed.

In this system, both ends of each divided image are displayed with partially overlapping with the adjacent divided images. As a result, the area of the highest background score on the left end of the first-stage divided image is also included on the right end of an $N^{th}$-stage divided image. With this setting, if the area of the lower background score is selected for the image end of an $m^{th}$ divided image (m=1, . . . N), the clipping position of the panoramic expansion image is reset with reference to a region of the second highest background score instead of the area of the highest background score. Thereafter, the above operation is repeated, and an optimum clipping reference position is set. This leads such an advantage that the links of the respective divided panoramic expansion images are understandable by the operator. In this situation, a constraint condition may be added so that image widths of the respective stages become equal to each other.

Figure 3A:
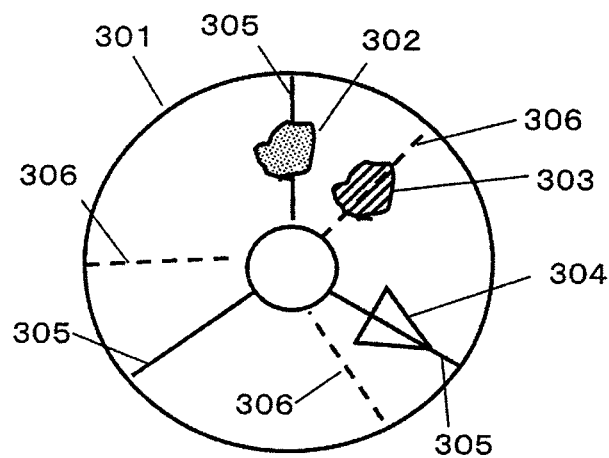
FIGS. 3(a) to 3(c) are illustrative diagrams illustrating a method of dividing an entire circumferential image.

The above appearance will be described with reference to FIGS. 3(a) to 3(c). FIG. 3(a) illustrates an appearance in which an area 302 of a first background score, an area 303 of a second background score, and an area 304 low in the background score are photographed in an entire circumferential image 301.

Figure 3B:
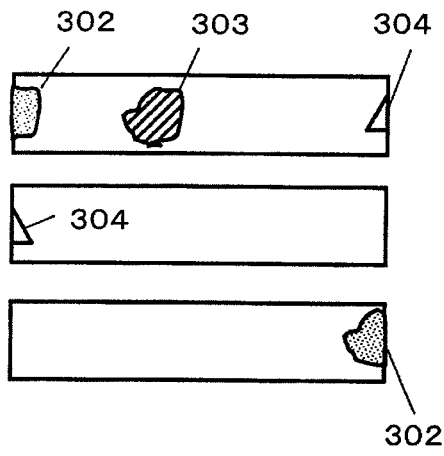

First, when the entire circumferential image 301 is divided into three pieces at first cut lines 305 with reference to the area 302 of the first background score as illustrated in FIG. 3(b), a body of the area 304 low in the background score gets across ends of the divided images of the first stage and the second stage.

Figure 3C:
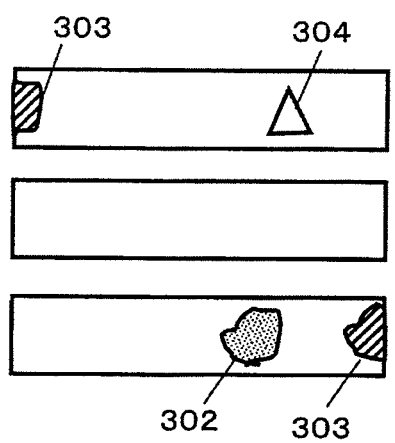

Under the circumstances, when the image is divided into pieces at second cut lines 306 with reference to the area 303 of the second background score as illustrated in FIG. 3(c), the area 304 low in the background score is displayed without being divided by the divided images.

When the update of the clipping reference position has been completed, or update is unnecessary, the object detection unit 105 then detects the objects in the panoramic expansion image, and outputs object detection results obtaining the scores representative of the object-ness (for example, persons) at the respective positions within the image.

Further, the object position calculation unit 106 determines a position where the score representative of the object-ness is equal to or higher than a threshold value as a position of the object on the basis of the object detection results, and outputs the object position information (Step 206).

Subsequently, the display image generation unit 107 determines and clips the clipping position of the panoramic expansion image generated by the panoramic expansion unit 102 according to the clipping reference position and the object position information (Step 207), and generates the panoramic image (Steps 208 to 210).

Specifically, it is determined whether a distance between the object detection results and the clipping reference position is equal to or higher than a given value, or not (Step 208).

If yes, the clipped panoramic images are generated so that the clipping reference position becomes the image end (Step 209). If no, the clipping reference position is adjusted to generate the clipped panoramic images (Step 210). The detail of processing of adjusting the clipping reference position in Step 210 will be described later.

FIG. 4 illustrates a display example according to the first embodiment. FIGS. 4(a) and 4(b) illustrate examples in which two clipped panoramic images are generated from the panoramic expansion image and displayed at two stages in a monitor 11. The respective clipped panoramic images are displayed on a divided screen upper stage 12 and a divided screen lower stage 13. FIG. 4(a) illustrates an example displaying the clipped panoramic images generated by using the clipping reference position set by the background information update unit as it is. In this situation, the same image is overlapped and displayed on a right end of the divided screen upper stage 12 and a left end of the divided screen lower stage 13.

Areas of 20 and 21 in FIG. 4(b) illustrate an example in which the clipped panoramic images generated after adjusting the clipping reference position, because a person is detected, is displayed by using extended display areas 14. The extended display areas 14 are display/non-display selectable areas which are prepared on right and left sides of the image for the purpose of varying a display width of the image to display the image, when an object 22 comes to a screen end.

FIG. 4(b) illustrates an example in which the image is displayed by using an extended display area 20 when the object 22 comes to the right end of the divided screen upper stage 12. Also, FIG. 4(b) illustrates an example in which the image is displayed by using an extended display area 21 on the left end of the divided screen lower stage 13.

In the extended display areas 14, arbitrary information may be displayed while display is conducted at the clipping reference position.

Figure 5:
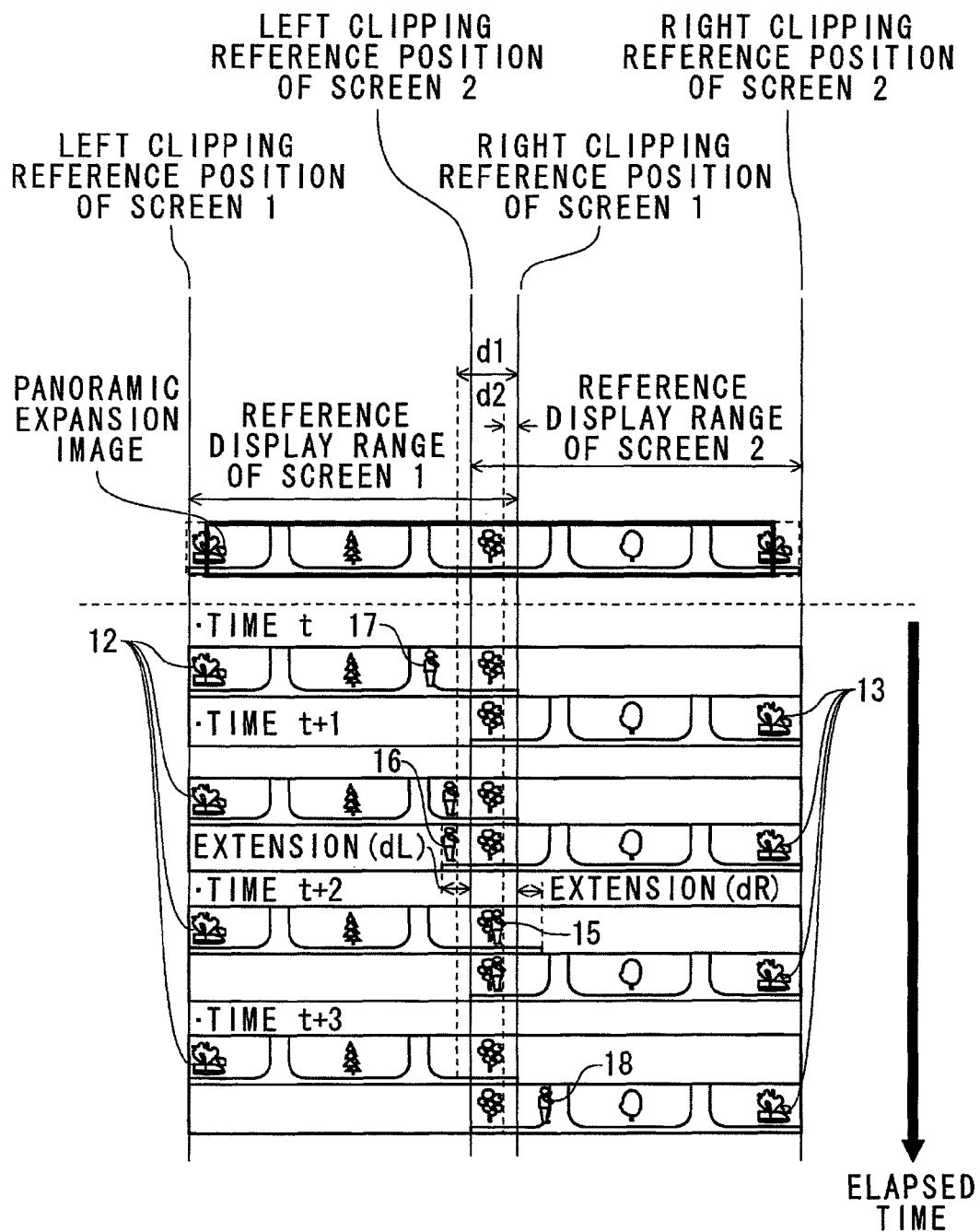
FIG. 5 is an illustrative diagram illustrating the operation of the panoramic expansion image display device using the extended display area.

FIG. 5 illustrates an operation example in this embodiment. FIG. 5 illustrates an example in which an object 17 (a person in this example) travels from left to right in the panoramic expansion image. An image surrounded by a thick frame on an upper portion of the figure is a panoramic expansion image. As described above, because the panoramic expansion image is an image having the ends connected to each other, the image can be dealt with as a sequential image even if the image falls outside the thick frame when clipping. Dotted line areas on the right and left sides of the thick frame correspond to images obtained by cutting out the panoramic expansion image at a given distance from the left (right) end, and connecting the cut image to the right (left) end as it is.

FIG. 5 illustrates an example in which the panoramic expansion image is divided into two stages and displayed as in FIGS. 4(a) and 4(b). In this example, a clipped panoramic image displayed on the upper stage is called "screen 1", and a clipped panoramic image displayed on the lower stage is called "screen 2". The clipping reference positions are obtained by the clipping reference position update unit in advance. As illustrated in the figure, the respective right and left clipping reference positions are obtained for the screen 1 and the screen 2. Also, an object position (person's position) 17 is detected by the object position calculation unit 106.

At a time t, the person's position 17 is distant from all of the right and left clipping reference positions of the screen 1 and the screen 2 by a given distance d1 or more. Therefore, both of the divided screen upper stage 12 and the divided screen lower stage 13 display the clipped panoramic images with the clipping reference positions as the screen ends, and the person is displayed on the divided screen upper stage 12.

When it comes to a time t+1, a person 16 comes closer to the given distance d1 from the right clipping reference position (corresponding to the right end of the divided screen upper stage 12 at the time t1) of a screen 1. For that reason, the clipped panoramic image of the screen 2 is generated so that a position obtained by adding a given distance dL to the left clipping reference position of the screen 2 becomes the screen end, and displayed on the divided screen lower stage 13. When the image is thus displayed, the person is displayed on both of the divided screen upper stage 12 and the divided screen lower stage 13. Also, this enables the user to be notified that the person comes closer to the screen end.

When it comes to a time t+2, a person 15 comes closer to a given distance d2 from the right clipping reference position (corresponding to the right end of the divided screen upper stage 12 at the time t1+1) of a screen 1. For that reason, the clipped panoramic image of the screen 1 is generated so that a position obtained by adding a given distance dR to the right clipping reference position of the screen 1 becomes the screen end, and displayed on the divided screen upper stage 12. Also, the clipped panoramic image of the screen 2 is generated so that the left clipping reference position of the screen 2 becomes the screen end, and displayed on the divided screen lower stage 13.

When a time is further gained to reach a time t+3, a person 18 is moved away from the left clipping reference position of the screen 2 by the distance d1 or more. As a result, the panoramic image is generated so that the clipping reference positions match the screen ends on both of the screen 1 and the screen 2, and displayed on the divided screen upper stage 12 and the divided screen lower stage 13. Likewise, when the object travels from right to left on the divided screen upper stage 12, each of the image ends having a connection relationship on the original panoramic expansion image such as the right end of the divided screen lower stage 13 and the left end of the divided screen upper stage 12 is expanded and contracted. As a result, the object can be displayed without any interruption. Even in a configuration where the panoramic image is displayed with three or more stages, when the object travels to the distances d1 and d2 from the respective image ends, the respective corresponding areas are expanded and contracted by distances dR and dL, to thereby obtain the same effects. In this situation, it is more effective to determine the sizes of d1, d2, dR, and dL taking a horizontal width of the object into consideration.

In the panoramic expansion image display device according to the first embodiment of the present invention as described above, the clipping reference position is set by the background feature extraction unit 103 and the clipping reference position update unit 104 so that an area having a graphic feature is selected preferentially for the respective image ends of the clipped panoramic expansion image. Further, the clipping positions of the panoramic expansion image are varied by the object position calculation unit 106 in conformity with the position of the object to expand and contract a display range. As a result, the object can be displayed without interruption on the image ends of the clipped panoramic images. Further, because the display range is expanded and contracted, the travel of the person is easily understood by the user.

Figure 2:
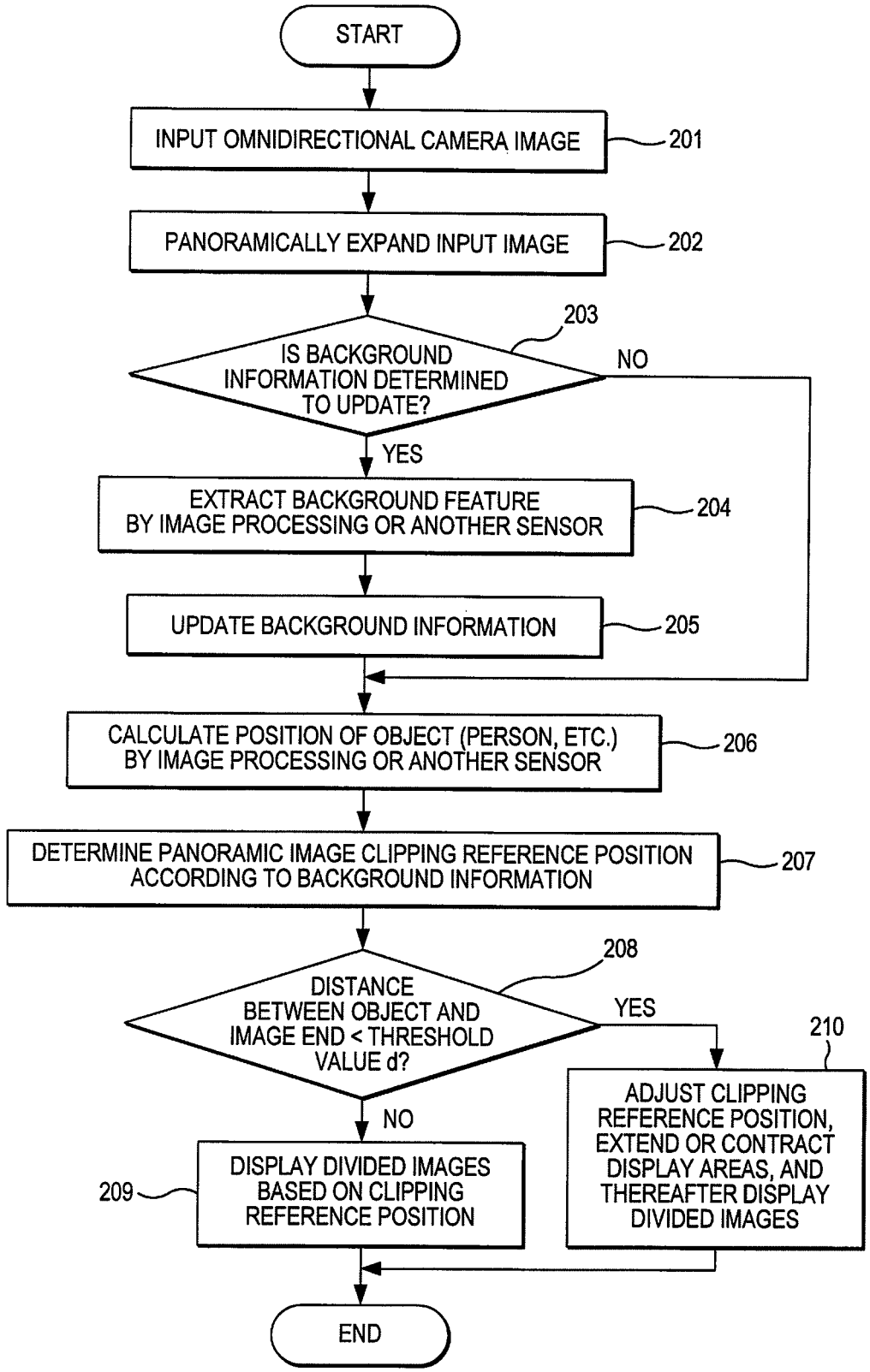
FIG. 2 is a flowchart illustrating the operation of the panoramic expansion image display device using an extended display area.
Figure 6:
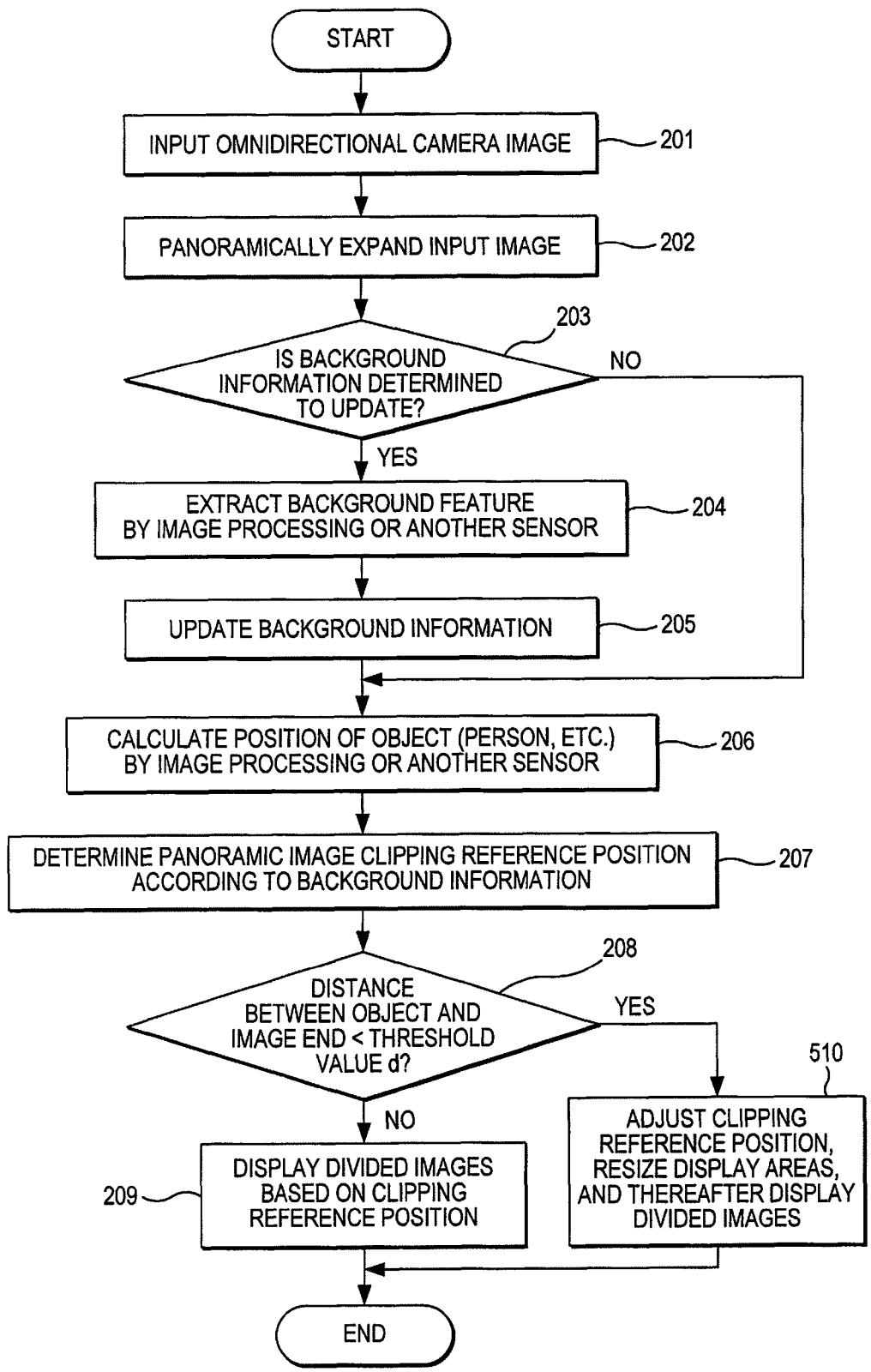
FIG. 6 is a flowchart illustrating the operation of the panoramic expansion image display device using resize processing.
Figure 7:
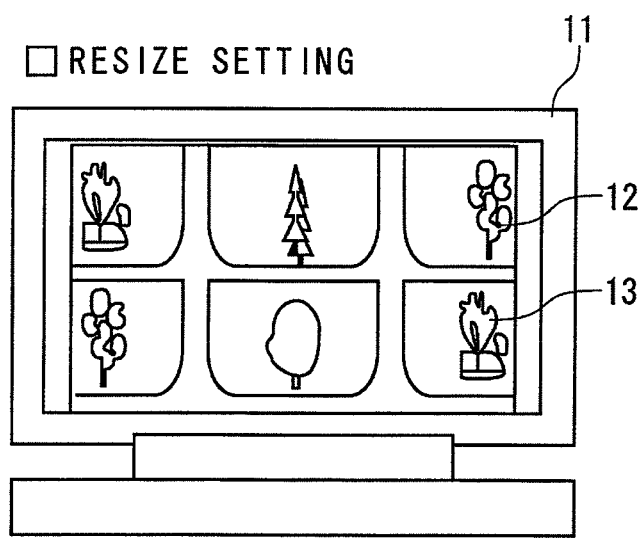
FIG. 7 is a diagram illustrating a two-screen configuration of the panoramic expansion image display device using the resize processing.
Figure 8:
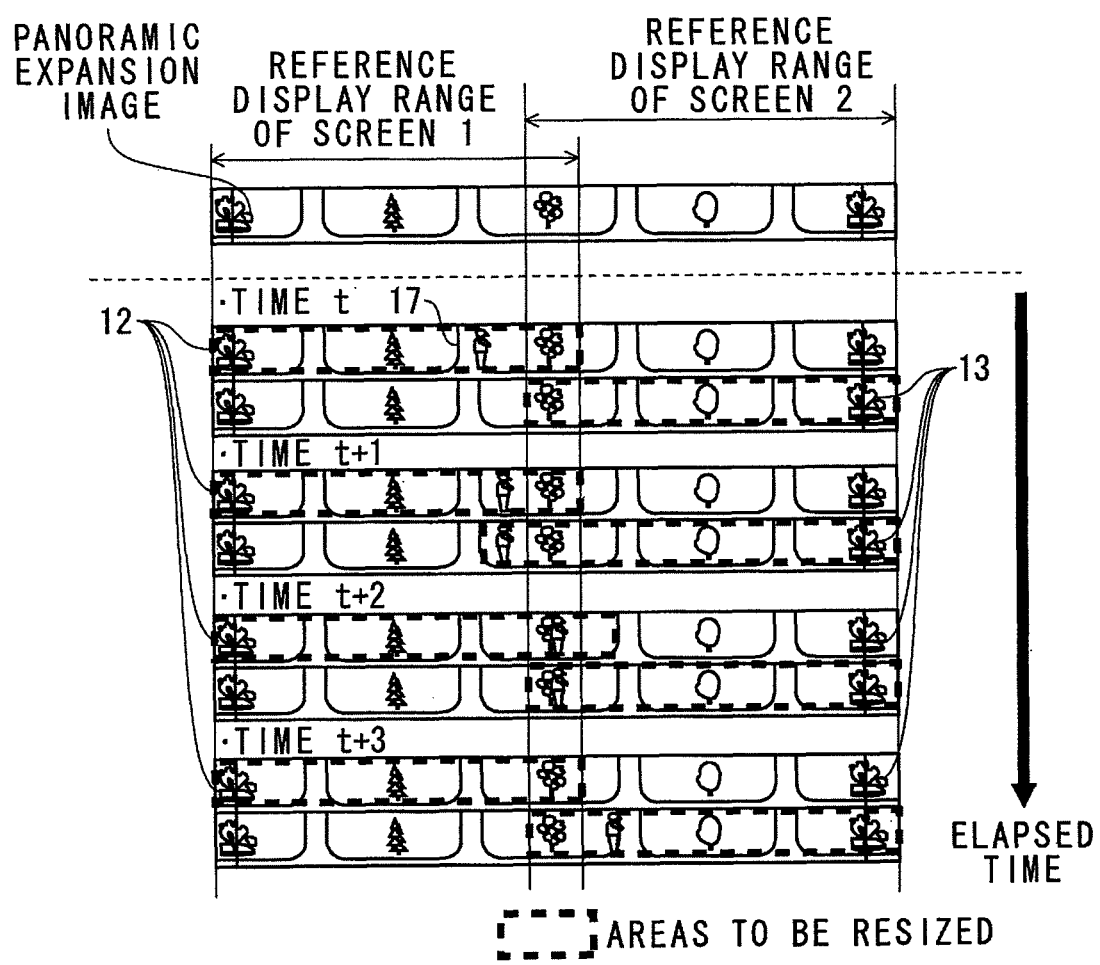
FIG. 8 is an illustrative diagram illustrating the operation of the panoramic expansion image display device using the resize processing.

In a display method when the object comes closer to the given distances d1 and d2 from the clipping reference position, the display range of the clipped panoramic image is fixed to a predetermined width without any expansion and contraction in advance, and the width of the clipped panoramic image (hereinafter, the panoramic image clipped with this width is called "area to be resized") is changed, the width may be resized. As a result, the object can be displayed without wasting the display area and without interruption. A flow using resizing is illustrated in FIG. 6, a display example of the screen is illustrated in FIG. 7, and an operation example is illustrated in FIG. 8. In FIG. 6, the same processing as that in the flow illustrated in FIG. 2 is indicated by identical numeral reference. In Step 510, the display area is resized and displayed instead of expansion and contraction. As illustrated in FIG. 7, since the respective clipped panoramic images are expanded and contracted in a real screen display, no extended display area is required. In FIG. 8, the areas to be resized in the above-mentioned example are represented by dotted line thick frames in the respective images of the time t to the time t+3. For example, the width of the areas to be resized in the screen 2 at the time t+1 is wider than that of the areas to be resized in the screen 2 at the time t. In this case, the areas to be resized in the screen 2 at the time t+1 is so resized as to reduce the width thereof, and displayed in conformity with the width at the time t.

Also, in the first embodiment, the image picked up by the omnidirectional camera using the fisheye lens or the like is set as input image. The same effects are obtained even when the panoramic image is created by using one or more normal cameras.

Also, it is not essential that the clipping reference position is obtained by using the background feature, and a position determined in advance or a position designated by the person may be set as the clipping reference position. Also, it is not essential to determine the clipping reference positions so that both ends of the respective clipped panoramic images overlap with each other, but the clipping reference positions may be determined so that those ends do not overlap with each other (the image ends of the adjacent clipped panoramic images are present at the same position or distant from each other). To determine the clipping reference position so that those ends overlap with each other is advantageous in that because the same body is included in the different panoramic expansion images, if the body is a characteristic body, the positional relationship is easily understood by the user. To determine the clipping reference position so that those ends do not overlap with each other is advantageous in that the display area can be saved. For that reason, the determination of the clipping reference positions may be selected according to applications or the use conditions.

Second Embodiment

Subsequently, a description will be given of a panoramic expansion image display device 800 according to a second embodiment of the present invention with reference to FIG. 9. The same constituent elements as those in the panoramic expansion image display device 100 described in the first embodiment are denoted by identical numeral references.

Figure 9:
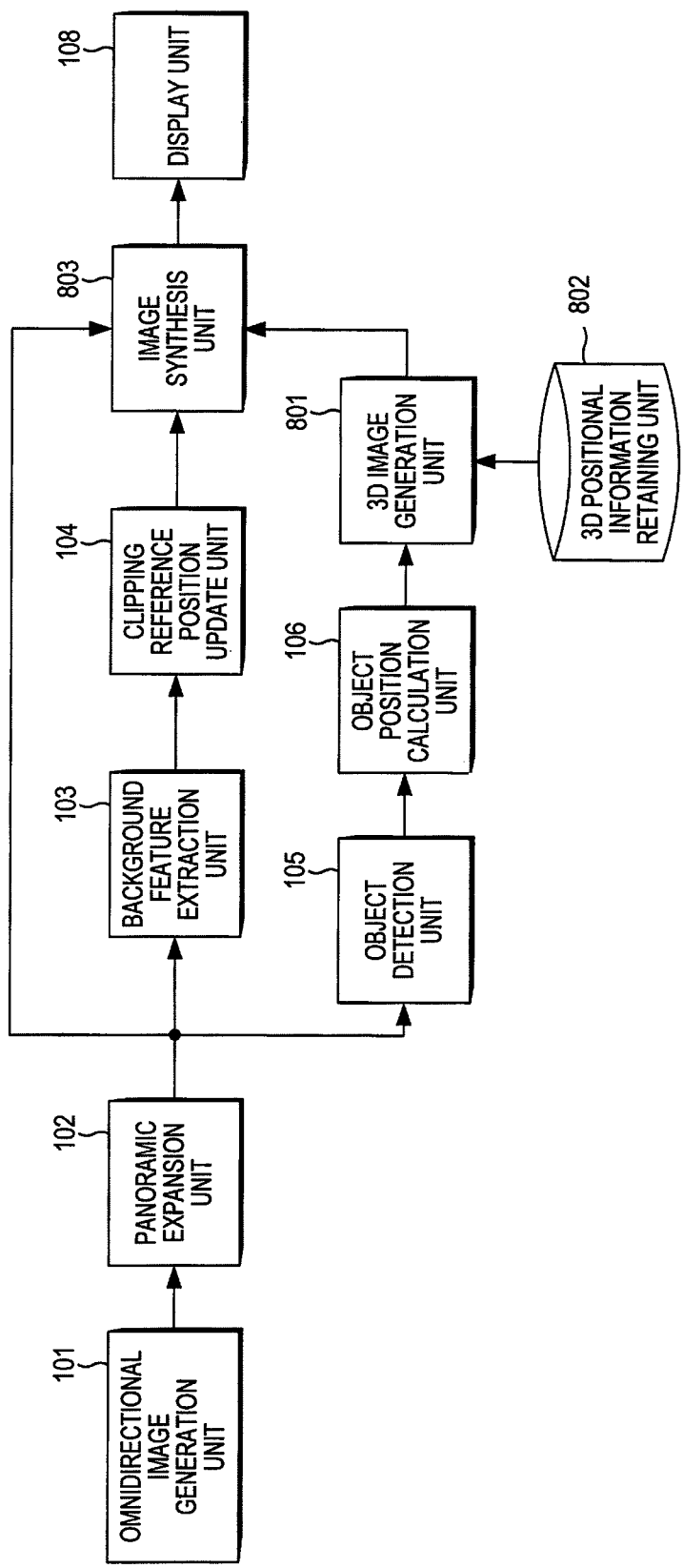
FIG. 9 is a block diagram of a panoramic expansion image display device according to a second embodiment of the present invention.

Referring to FIG. 9, according to the second embodiment of the present invention, the panoramic expansion image display device 800 includes the omnidirectional image generation unit 101, the panoramic expansion unit 102, the background feature extraction unit 103 that extracts the image feature amount of a background from the panoramic expansion image, the clipping reference position update unit 104 that updates a position suitable to clip the panoramic image on the basis of the background feature, the object detection unit 105 that detects the object which is a display target, and the object position calculation unit 106 that calculates the detected object position. The panoramic expansion image display device 800 also includes a 3D image generation unit 801 that calculates 3D positional information (information on the degree of protrusion from the screen when creating the 3D image) on the basis of the detected object information to generate a 3D image of the object, a 3D positional information retaining unit 802 that retains the 3D positional information corresponding to the respective object positions, and an image synthesis unit 803 that synthesizes an image from the generated 3D image and the clipped panoramic image clipped from the panoramic expansion image according to the clipping reference position, and the display unit 108 that displays the synthesized image.

Figures 11A, 11B:
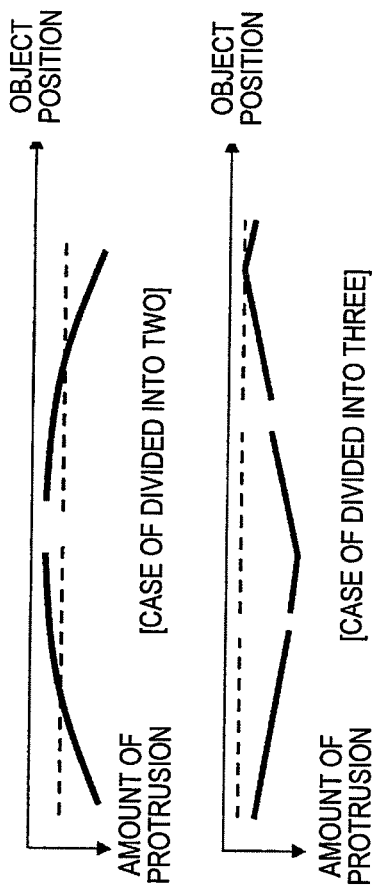
FIGS. 11(a) and 11(b) are diagrams illustrating a data example held by a 3D positional information retaining unit.

The 3D positional information retaining unit 802 retains the 3D positional information corresponding to the object position within the clipped panoramic image, may determine the 3D positional information in advance according to a case in which the panoramic expansion image is divided into two pieces, or a case in which the panoramic expansion image is divided into three pieces. The 3D positional information on the corresponding image ends of the adjacent clipped panoramic images is set to the same value. As a result, when the object travels across the clipped panoramic images, the degree of protrusion of the object is identical with each other. Therefore, the association of the same object is easily conducted. FIG. 11 illustrates an example of the data held by the 3D positional information retaining unit. FIG. 11(a) schematically illustrates the degree of protrusion of 3D according to the object position when the panoramic expansion image is divided into two pieces. (b) illustrates a case in which the panoramic expansion image is divided into three pieces. In this example, dotted line portions correspond to one clipped panoramic image, and thick line portions correspond to the amount of protrusion. That is, if the clipping reference position (positions of the ends of the dotted line) and the object position are found, the amount of protrusion can be obtained.

The 3D image of not only the object but also the background is generated on the basis of the 3D positional information. As a result, even if the object does not travel, it is easy to understand which end of another clipped panoramic image is connected to an end of one clipped panoramic image.

Figure 10:
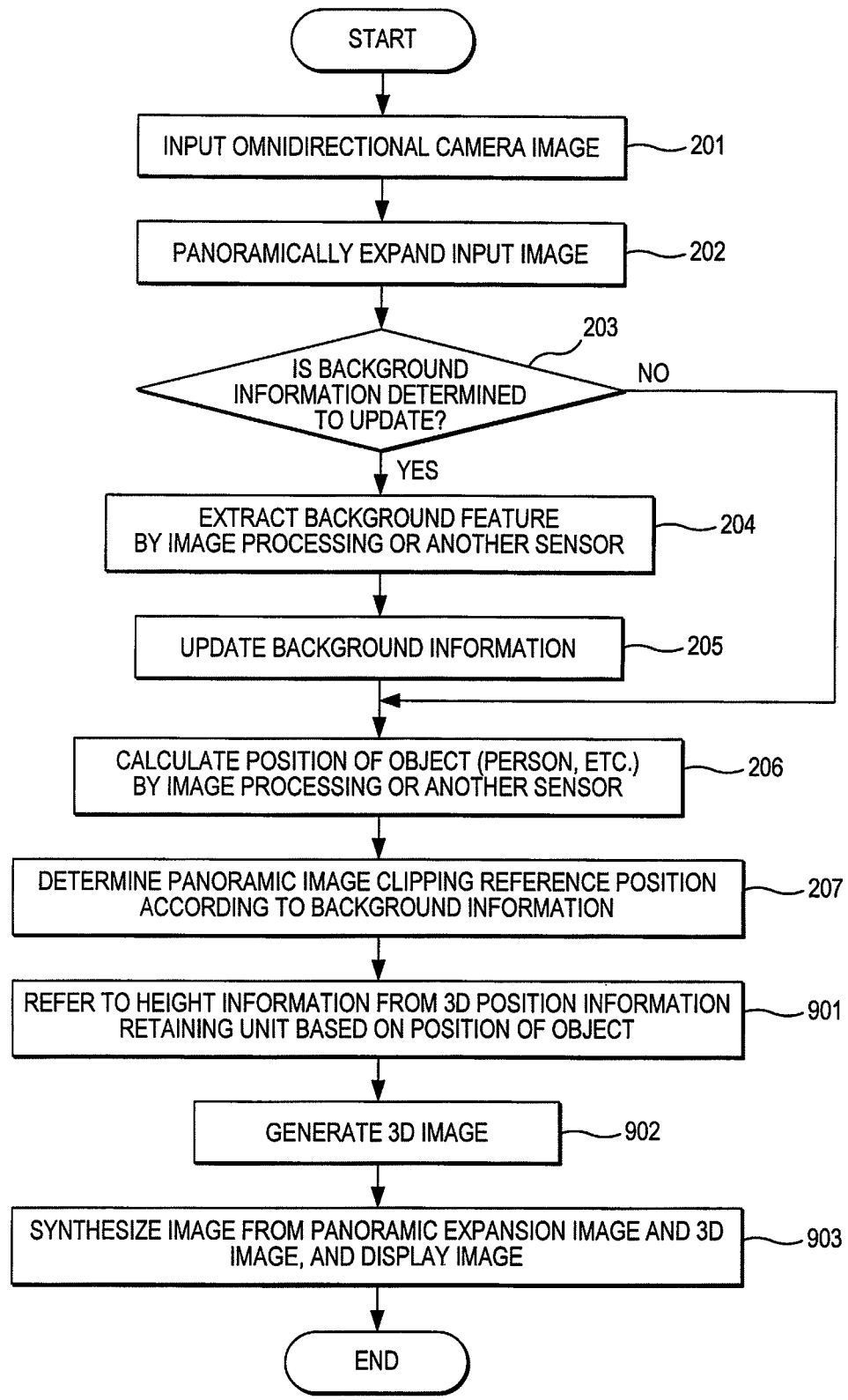
FIG. 10 is a flowchart illustrating the operation of the panoramic expansion image display device using 3D display.

The operation of the panoramic expansion image display device configured as described above will be described with reference to FIG. 10.

Steps 201 to 207 are identical with those in the first embodiment. At a time point when Step 207 is finished, the clipping reference position and the object position are obtained. Subsequently, the 3D image generation unit 801 obtains the amount of protrusion on the basis of the output positional information of the object and the 3D positional information stored in the 3D positional information retaining unit 802 (Step 901). The 3D image generation unit 801 creates the 3D image of the object that seems protruded with the obtained amount of protrusion (Step 902). Finally, the image synthesis unit 803 synthesizes an image from the clipped panoramic image in which the object is present, and the 3D image of the object, and creates an image to be displayed.

Figure 12:
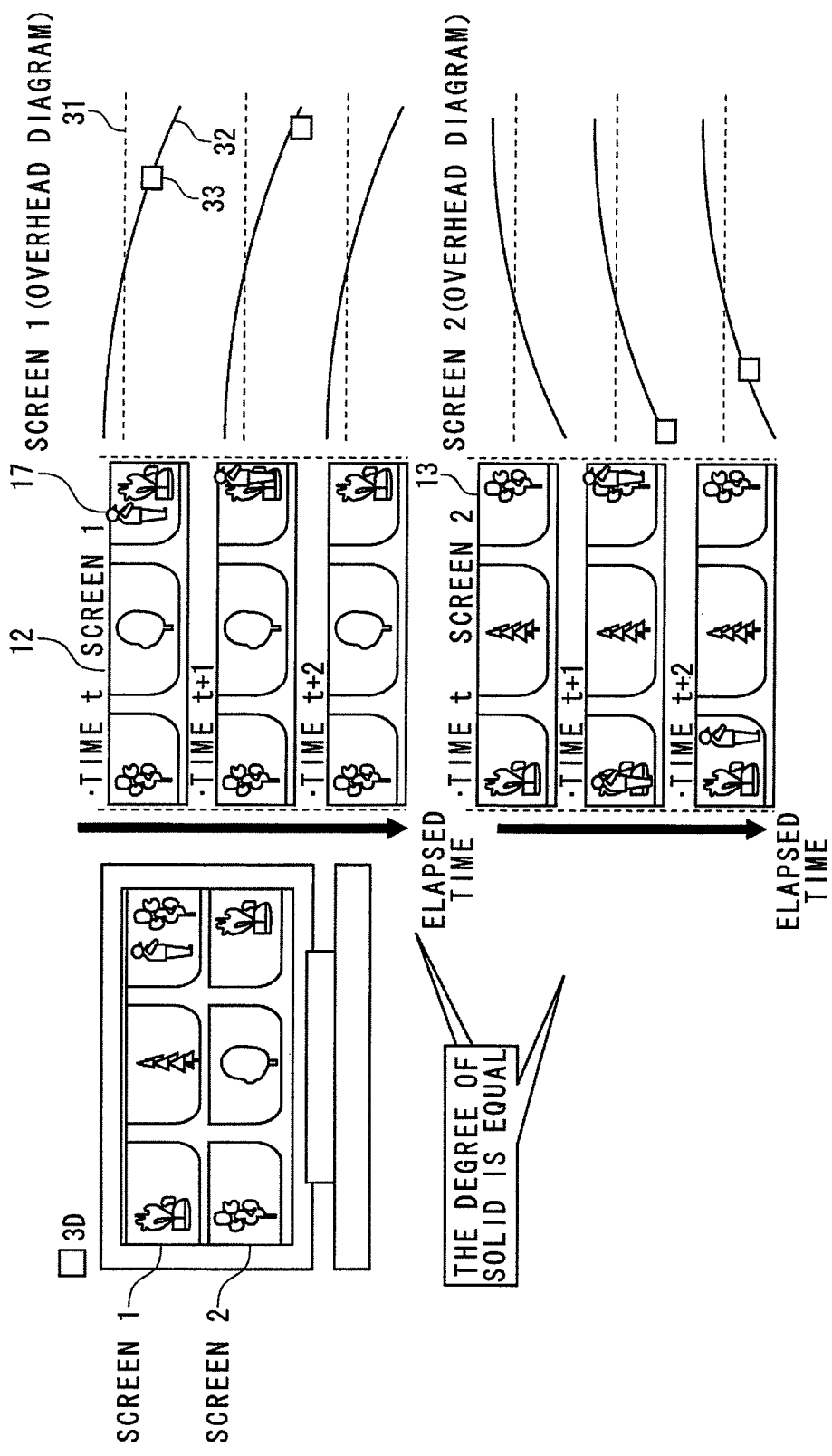
FIG. 12 is a diagram illustrating an operation example of the panoramic expansion image display device using the 3D display.

A 3D image generation example is illustrated in FIG. 12. FIG. 12 is an overhead diagram virtually illustrating a drawing plan, when a hypothetical plane 31 is ±0 in depth, for example, the screen 1 expresses that the left side is displayed in the back, and the right side is protruded in the front and displayed. The degree of a stereoscopic view for each position of the object is saved by the 3D positional information retaining unit 802. The 3D image is generated in the 3D image generation unit 801 on the basis of the positional information of each object so that the object image can be viewed stereoscopically. The image is synthesized from the generated 3D image and the original panoramic expansion image by the image synthesis unit 803, and thereafter displayed in the display unit 108. In this situation, in the respective divided panoramic images, the adjacent portions are so displayed as to be viewed stereoscopically with the same height. For example, in FIG. 12, the right end of the screen 1 and the left end of the screen 2 display the same area, and a 3D depth information line 32 indicative of depth information for each position of an object 33 is adjusted by the 3D positional information retaining unit 802 so that both of those ends become at the same height. The same is applied to the left end of the screen 1 and the right end of the screen 2. In this example, if the 3D positional information is set by the 3D positional information retaining unit so that the degree of protrusion is different between the right end and the left end of the screen 1, even if two objects travel on the right end and the left end of the screen 1 at the same time, the degree of protrusion is different between those two objects. As a result, in the image, the link of the image ends to each other can be easily understood.

In the panoramic expansion image display device according to the second embodiment of the present invention as described above, the object is detected by the object detection unit 105, the 3D information on the appropriated position is referred to by the 3D positional information retaining unit 802, and the 3D image is generated by the 3D image generation unit 801 and displayed. With this configuration, even when the panoramic expansion image is divided into a plurality of stages, the link of the respective image ends to each other after division can be so displayed as to be easily understood.

In this embodiment, the panoramic expansion image is divided into two screens. Likewise, when the panoramic expansion image is divided into three or more screens, the adjacent areas can be displayed three-dimensionally with the same height. Also, the above effects are obtained by making the heights of the adjacent areas equal to each other, but the degree of solid is arbitrary. That is, the screen ends do not always need to have the maximum height, or have the maximum depth.

Further, when the image is synthesized from the 3D information and the background by the image synthesis unit 803, the clipping position of the background image is determined to clip the panoramic image on the basis of the clipping position of the background detected by the clipping reference position update unit 104 and the position of the object calculated by the object position calculation unit 106 as in the first embodiment. The 3D information can be synthesized with the clipped panoramic image as the background.

The present invention has been described in detail and with reference to the specific embodiments, but it would be apparent to an ordinary skilled person that the invention can be variously changed and modified without departing from the spirit and scope of the present invention.

The present invention is based on Japanese Patent Application No. 2010-112855 filed on May 17, 2010, and content thereof is incorporated herein by reference.

INDUSTRIAL APPLICABILITY

As has been described above, the panoramic expansion image display device according to the present invention has such an advantage that the clipping position and the method of displaying the panoramic expansion image can be varied in conformity with the travel of the object, and is useful as the method of displaying the panoramic image created by using the omnidirectional camera or the plurality of cameras, and can be widely used, for example, for monitor solution or the like using the omnidirectional camera.

DESCRIPTION OF REFERENCE SIGNS

101: Omnidirectional Image Generation Unit
102: Panoramic Expansion Unit
103: Background Feature Extraction Unit
104: Clipping Reference Position Update Unit
105: Object Detection Unit
106: Object Position Calculation Unit
107: Display Image Generation Unit
108: Display Unit

The invention claimed is:

1. A display device, comprising:
an image processor that:
sets a clipping reference position in a panoramic expansion image;
detects an object as a display target from the panoramic expansion image;
determines a first clipping position, that is at a different position from the clipping reference position, as a determined clipping position when the display target is within a reference distance from intersecting with the clipping reference position, and determines a second clipping position, that is at a same position as the clipping reference position, as the determined clipping position when the display target is out of the reference distance from intersecting with the clipping reference position;
clips the panoramic expansion image at one of the first clipping position or the second clipping position to obtain at least two panoramic images from the panoramic expansion image, each of the at least two panoramic images including a different part of the panoramic expansion image; and
generates the at least two panoramic images to be displayed separately on a display,
wherein the at least two panoramic images display all image information displayed on the panoramic expansion image, and
wherein a panoramic image of the at least two panoramic images clipped at the first clipping position is expanded to increase width.

2. The display device according to claim 1,
wherein the panoramic expansion image is an expanded moving image, and
wherein the image processor determines the first clipping position such that a total body of the object is contained in at least one of the panoramic images when a position of the object approaches the clipping reference position.

3. The display device according to claim 1, wherein the display displays the at least two panoramic images in a display area,
wherein, when the first clipping position is determined, the image processor changes a size of at least one of the panoramic images according to the display area and the display displays at least one of the panoramic images after the size is changed.

4. The display device according to claim 1, wherein the image processor further extracts a background image feature of a background from the panoramic expansion image, and determines the clipping reference position based on the background image feature.

5. The display device according to claim 4,
wherein the background image feature is extracted from the panoramic expansion image using color information.

6. The display device according to claim 4,
wherein the background image feature is extracted from the panoramic expansion image using character information.

7. The display device according to claim 4,
wherein the background image feature is extracted from the panoramic expansion image using texture information.

8. The display device according to claim 4,
wherein the background image feature is extracted from the panoramic expansion image using detection frequency information on the object.

9. The display device according to claim 1,
wherein the image processor makes the determination such that the ends of the panoramic images overlap with each other.

10. A display device, comprising:
an image processor that:
sets a clipping reference position in a panoramic expansion image;
detects an object as a display target from the panoramic expansion image;
determines a first clipping position, that is at a different position from the clipping reference position, as a determined clipping position when the display target is within a reference distance from intersecting with the clipping reference position, and determines a second clipping position, that is at a same position as the clipping reference position, as the determined clipping position when the display target is out of the reference distance from intersecting with the clipping reference position;
clips the panoramic expansion image at one of the first clipping position or the second clipping position to obtain at least two panoramic images from the panoramic expansion image, each of the at least two panoramic images including a different part of the panoramic expansion image;
determines a degree of 3D protrusion of each of the at least two panoramic images, such that the object protrudes with substantially the same 3D degree in each of the at least two panoramic images; and
creates a 3D image in which the object protrudes, according to the determined degree of 3D protrusion,
wherein the at least two panoramic images display all image information displayed on the panoramic expansion image, and
wherein a panoramic image of the at least two panoramic images clipped at the first clipping position is expanded to increase width.

11. A display device, comprising:
an image processor that:
sets a clipping reference position in a panoramic expansion image;
detects an object as a display target from the panoramic expansion image;
divides the panoramic expansion image into a first panoramic image having a first end and a second panoramic image having a second end, the first end and the second end being connected to each other;
determines a degree of 3D protrusion of each of the first and the second panoramic images, such that the first end and the second end protrude with substantially the same degree; and
creates a 3D image in which the object protrudes, according to the determined degree of 3D protrusion,
wherein the panoramic expansion image is divided along a first clipping position, that is at a different position from the clipping reference position, as a determined clipping position when the display target is within a reference distance from intersecting with the clipping reference position, and divides the panoramic expansion image along a second clipping position, that is at a same position as the clipping reference position, as the determined clipping position when the display target is out of the reference distance from intersecting with the clipping reference position,
wherein the first panoramic image and the second panoramic image display all image information displayed on the panoramic expansion image, and
wherein one of the first panoramic image or the second panoramic image divided at the first clipping position is expanded to increase width.

12. A method, comprising:
setting a clipping reference position in a panoramic expansion image;
detecting an object as a display target from the panoramic expansion image;
determining a first clipping position, that is at a different position from the clipping reference position, as a determined clipping position when the display target is within a reference distance from intersecting with the clipping reference position, and determines a second clipping position, that is at a same position as the clipping reference position, as the determined clipping position when the display target is out of the reference distance from intersecting with the clipping reference position;
clipping the panoramic expansion image at the determined clipping position to obtain at least two panoramic images from the panoramic expansion image, each of the at least two panoramic images including a different part of the panoramic expansion image; and
generating the at least two panoramic images to be displayed separately,
wherein the at least two panoramic images display all image information displayed on the panoramic expansion image, and
wherein a panoramic image of the at least two panoramic images clipped at the first clipping position is expanded to increase width.

13. The display device according to claim 1, wherein, the image processor determines,
when the distance between the object and the clipping reference position is larger than a predetermined distance, the second clipping position as the determined clipping position, and
when the distance between the object and the clipping reference position is not larger than the predetermined distance, the first clipping position as the determined clipping position such that at least one of the panoramic images includes a larger display area than a panoramic image generated by clipping at the clipping reference position.

14. The display device according to claim 9, wherein, the image processor determines,
when the distance between the object and the clipping reference position is larger than a predetermined distance, the second clipping position as the determined clipping position, and
when the distance between the object and the clipping reference position is not larger than the predetermined distance, the first clipping position as the determined clipping position such that the overlapped part is expanded.

15. The display device according to claim 1, wherein the image processor further calculates a position of the object with respect to the clipping reference position,
   wherein the at least two panoramic images partially overlap each other, and each of the panoramic images include a display area and an adjustable display area, the adjustable display area configured to display or not display the object on at least a portion of the adjustable display area based on the position of the object with respect to the reference clipping position.

16. The display device according to claim 1, wherein the image processor further determines a position of the object with respect to the clipping reference position,
   wherein the at least two panoramic images partially overlap each other, and each of the panoramic images include a display area and an adjustable display area, the adjustable display provided on an overlapped portion of the panoramic images,
   wherein, when the object is located within a reference distance from an end of one of the panoramic images, the adjustable display area displays an image on at least a portion of the adjustable area, and
   wherein, when the object is beyond the reference distance from an end of one of the panoramic images, the adjustable display area does not display an image on the adjustable area.

17. The display device according to claim 1,
   wherein the determined clipping position is determined to be different from the clipping reference position when the display target intersects the clipping reference position.

18. The display device according to claim 1,
   wherein the determined clipping position is determined to be the same as the clipping reference position when the display target does not intersect the clipping reference position.

19. The display device according to claim 1,
   wherein each panoramic image of the at least two panoramic images is displayed on the display,
   in a default width and a default scaling, when the second clipping position is determined as the determined clipping position,
   in a wider width than the default width, when the first clipping position is determined as the determined clipping position, and
   the panoramic image displayed in the wider width displays a portion of an adjustable display area not shown in the default width, and/or in a smaller scaling than the default scaling.

20. The display device according to claim 1,
   wherein when one of the at least two panoramic images is obtained by clipping the panoramic expansion image at the second clipping position, the obtained panoramic image is modified in size to include image information including the display target, and
   when one of the at least two panoramic images is obtained by clipping the panoramic expansion image at the first clipping position, the obtained panoramic image is provided in a default size to include image information including the display target.

* * * * *